(12) United States Patent
Foerster et al.

(10) Patent No.: US 12,220,658 B2
(45) Date of Patent: *Feb. 11, 2025

(54) METHOD FOR COATING A WALL-FLOW FILTER

(71) Applicant: UMICORE AG & CO. KG, Hanau-Wolfgang (DE)

(72) Inventors: Martin Foerster, Büdingen (DE); Antje Oltersdorf, Freiburg (DE); Naina Deibel, Pfungstadt (DE); Sascha Zoelle, Steinen (DE); Jürgen Koch, Hanau (DE); Manuel Gensch, Aschaffenburg (DE); Wolfgang Hasselmann, Rheinfelden (DE)

(73) Assignee: UMICORE AG & CO. KG, Hanau-Wolfgang (DE)

( * ) Notice: Subject to any disclaimer, the term of this patent is extended or adjusted under 35 U.S.C. 154(b) by 1005 days.

This patent is subject to a terminal disclaimer.

(21) Appl. No.: 17/053,505

(22) PCT Filed: May 8, 2019

(86) PCT No.: PCT/EP2019/061786
§ 371 (c)(1),
(2) Date: Nov. 6, 2020

(87) PCT Pub. No.: WO2019/215208
PCT Pub. Date: Nov. 14, 2019

(65) Prior Publication Data
US 2021/0236976 A1     Aug. 5, 2021

(30) Foreign Application Priority Data
May 9, 2018   (DE) .................... 10 2018 111 246.7

(51) Int. Cl.
  *B01D 46/00*    (2022.01)
  *B01D 53/94*    (2006.01)
  (Continued)

(52) U.S. Cl.
  CPC ......... *B01D 46/0001* (2013.01); *B01D 53/94* (2013.01); *B01J 21/04* (2013.01);
  (Continued)

(58) Field of Classification Search
  CPC ........................ B01D 46/0001; B01D 53/94
  See application file for complete search history.

(56) References Cited

U.S. PATENT DOCUMENTS

| 108,408 A | 10/1870 | Tilghman |
| 4,351,811 A | 9/1982 | Matsuda et al. |

(Continued)

FOREIGN PATENT DOCUMENTS

| CN | 102188858 A | 9/2011 |
| DE | 28 32 002 A1 | 1/1979 |

(Continued)

OTHER PUBLICATIONS

Mayer, T. Feststoff—SCR-System auf Basis von Ammoniumcarbamat [Solid SCR system based on ammonium carbamate], dissertation, Technical University of Kaiserslautern, 2005 (161 Pages).

(Continued)

*Primary Examiner* — Robert A Vetere
(74) *Attorney, Agent, or Firm* — Smith, Gambrell & Russell, LLP

(57) ABSTRACT

The present invention relates to a method for producing a coated wall-flow filter. The wall-flow filter is coated with a powder aerosol.

24 Claims, 6 Drawing Sheets

Figure 1:
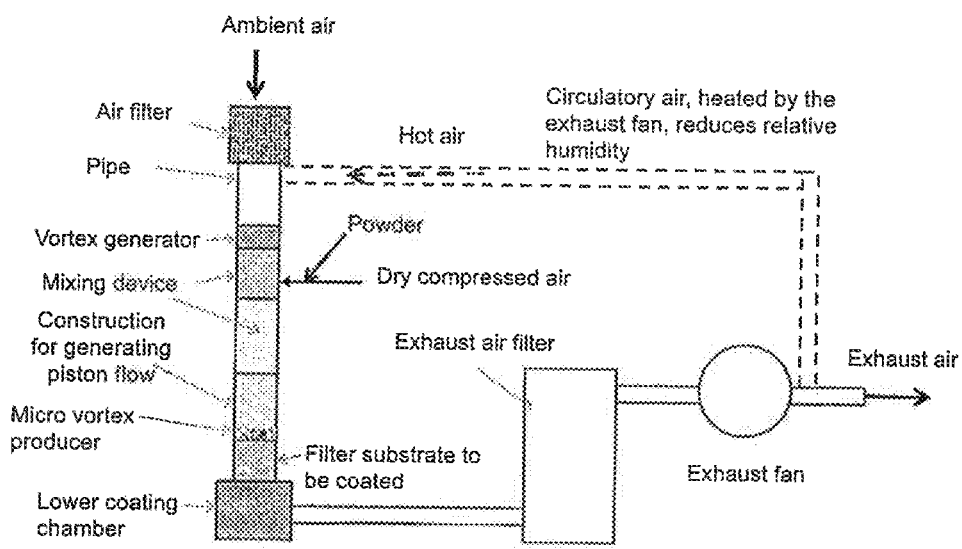

(51) Int. Cl.
  *B01J 21/04*  (2006.01)
  *B01J 23/44*  (2006.01)
  *B01J 35/56*  (2024.01)
  *B01J 37/02*  (2006.01)
  *F01N 3/035*  (2006.01)

(52) U.S. Cl.
  CPC ............... *B01J 23/44* (2013.01); *B01J 35/56* (2024.01); *B01J 37/023* (2013.01); *F01N 3/035* (2013.01); *B01D 2255/9155* (2013.01); *B01D 2279/30* (2013.01); *F01N 2510/068* (2013.01)

(56) References Cited

U.S. PATENT DOCUMENTS

| | | | |
|---|---|---|---|
| 4,609,563 A | | 9/1986 | Shimrock et al. |
| 5,454,872 A | * | 10/1995 | Lader ................ B05D 1/06 |
| | | | 118/313 |
| 6,220,791 B1 | | 4/2001 | Hutchins |
| 6,387,338 B1 | | 5/2002 | Anatoly et al. |
| 6,468,941 B1 | | 10/2002 | Bortun et al. |
| 6,478,874 B1 | | 11/2002 | Rosynsky et al. |
| 6,548,105 B2 | | 4/2003 | Kiessling et al. |
| 6,605,264 B2 | | 8/2003 | Bortun et al. |
| 6,843,971 B2 | | 1/2005 | Schäfer-Sidlinger et al. |
| 6,875,725 B2 | | 4/2005 | Lindner et al. |
| 7,041,622 B2 | | 5/2006 | Nunan |
| 8,277,880 B2 | | 10/2012 | Sato et al. |
| 8,388,721 B2 | | 3/2013 | Ishizawa |
| 8,454,917 B2 | | 6/2013 | Hoyer et al. |
| 8,495,968 B2 | | 7/2013 | Tsuji et al. |
| 8,534,221 B2 | | 9/2013 | Tsuji et al. |
| 8,632,852 B2 | | 1/2014 | Tsuji et al. |
| 8,640,440 B2 | | 2/2014 | Klingmann et al. |
| 8,663,588 B2 | | 3/2014 | Lindner et al. |
| 8,678,196 B2 | | 3/2014 | Kaiser et al. |
| 9,517,462 B2 | | 12/2016 | Roesch et al. |
| 11,305,269 B2 | * | 4/2022 | Deibel ............. B01D 46/24492 |
| 11,441,459 B2 | * | 9/2022 | Deibel ................... F01N 3/2066 |
| 11,566,548 B2 | * | 1/2023 | Foerster ................... B01J 35/04 |
| 11,808,189 B2 | * | 11/2023 | Gensch ................... F01N 3/035 |
| 2001/0003351 A1 | | 6/2001 | Chen et al. |
| 2006/0010857 A1 | | 1/2006 | Hu et al. |
| 2008/0107806 A1 | | 5/2008 | Mergner et al. |
| 2010/0011726 A1 | * | 1/2010 | Ishikawa ............... F01N 3/0222 |
| | | | 427/181 |
| 2010/0055012 A1 | | 3/2010 | Grisstede et al. |
| 2011/0229634 A1 | * | 9/2011 | Tsuji ........................ C04B 41/87 |
| | | | 427/181 |
| 2013/0149440 A1 | | 6/2013 | Pyzik et al. |
| 2016/0310935 A1 | * | 10/2016 | Sutton .................. B01D 53/944 |
| 2021/0138447 A1 | | 5/2021 | Deibel et al. |

FOREIGN PATENT DOCUMENTS

| | | |
|---|---|---|
| DE | 4225970 C1 | 4/1994 |
| DE | 199 21 409 A1 | 11/2000 |
| DE | 10 2010 015 364 A1 | 10/2011 |
| DE | 10 2012 220 181 A1 | 5/2014 |
| DE | 10 2018 110 804 A1 | 11/2019 |
| EP | 0 311 758 A1 | 4/1989 |
| EP | 0 324 082 A1 | 7/1989 |
| EP | 1 064 094 B1 | 9/2002 |
| EP | 1 181 970 B1 | 2/2004 |
| EP | 1 136 462 B1 | 8/2004 |
| EP | 1 147 801 B1 | 9/2004 |
| EP | 1 775 022 A1 | 4/2007 |
| EP | 1 911 506 A1 | 4/2008 |
| EP | 2 042 225 A1 | 4/2009 |
| EP | 2 371 451 B1 | 10/2011 |
| EP | 2 388 072 A1 | 11/2011 |
| EP | 2 415 522 A1 | 2/2012 |
| EP | 2 502 661 A1 | 9/2012 |
| EP | 2 610 448 A2 | 7/2013 |
| EP | 2 521 618 B1 | 8/2013 |
| EP | 1 541 220 B1 | 2/2014 |
| EP | 2 727 640 A1 | 5/2014 |
| EP | 2 502 662 B1 | 6/2014 |
| EP | 2 371 452 B1 | 3/2016 |
| EP | 1 789 190 B1 | 6/2017 |
| JP | H01-151706 A | 6/1989 |
| JP | 5378659 B2 | 12/2013 |
| JP | 2014-205108 A | 10/2014 |
| WO | 99/47260 A1 | 9/1999 |
| WO | 2004/076829 A1 | 9/2004 |
| WO | 2005/016497 A1 | 2/2005 |
| WO | 2005/022667 A2 | 3/2005 |
| WO | 2005/113126 A1 | 12/2005 |
| WO | 2008/000449 A2 | 1/2008 |
| WO | 2008/113445 A1 | 9/2008 |
| WO | 2010/015573 A2 | 2/2010 |
| WO | 2010/097146 A1 | 9/2010 |
| WO | 2011/151711 A1 | 12/2011 |
| WO | 2012/030534 A1 | 3/2012 |
| WO | 2012/175409 A1 | 12/2012 |
| WO | 2013/092707 A1 | 6/2013 |
| WO | 2015/049110 A1 | 4/2015 |
| WO | 2015/143191 A1 | 9/2015 |

OTHER PUBLICATIONS

Extended European Search Report mailed Jun. 17, 2022 for European Patent Application No. 2216315.1 (8 pages in German; 5 pages English Translation).
Notice of Allowance and Fees Due mailed Dec. 16, 2021 for U.S. Appl. No. 17/045,860 (7 pages).
Non Final Office Action mailed Aug. 30, 2021 for U.S. Appl. No. 17/045,860 (7 pages).
International Search Report for International Patent Application No. PCT/EP2019/061786 dated Jul. 23, 2019 (4 Pages in German with translation).
Written Opinion for International Patent Application No. PCT/EP2019/061786 dated Jul. 23, 2019 (6 Pages in German with translation).
International Preliminary Report on Patentability for International Patent Application No. PCT/EP2019/061786 dated Nov. 10, 2020 (7 Pages in German with translation).
Heck, R. M. et al. Catalytic Air Pollution Control, Commercial Technology, 1995, p. 86-89.
ISO 11465—Soil Quality—Determination fo dry matter and water content on a mass basis—Gravimetric Method. 1993 (8 pages).
DIN 66133. Jun. 1993, Bestimmung der Porenvolumenverteilung und der spezifischen Oberfläche von Feststoffen durch Quecksilberintrusionv. [Determination of the pore volume distribution and the specific surface area of solids by mercury intrusion] (3 pages in German with machine translation).
DIN 66134. Feb. 1998, Bestimmung der Porengrößenverteilung und der spezifischen Oberfläche mesoporöser Feststoffe durch Stickstoffsorption Verfahren nach Barrett, Joyner und Halenda (BJH) [Determination of the pore size distribution and the specific surface mesoporous solids by nitrogen sorption Procedure according to Barrett, Joyner and Halenda (BJH)] (7 pages in German with machine translation).
ISO 13320: 2009(E). Particle size analysis—Laser diffraction Methods (60 pages).
Database of Zeolite Structures—CHA Framework Type. Accessed Apr. 10, 2018. http://europe.iza-structure.org/IZA-SC/framework.php?STC=CHA.
Database of Zeolite Structures—AEI Framework Type. Accessed Apr. 10, 2018. http://europe.iza-structure.org/IZA-SC/framework.php?STC=AEI.
Tuenter, G. et al. Kinetics and Mechanism of the $NO_x$ Reduction with $NH_3$ on $V_2O_5$-$WO_3$-$TiO_2$ Catalyst. Ind. Eng. Chem. Prod. Res. Dev. 1986. vol. 25, pp. 633-636.
Kasaoka, S. et al., Effect of Inlet NO/NO2 Molar Ratio and Contribution of Oxygen in the Catalytic Reduction of Nitrogen Oxides with Ammonia. Nippon Kagaku Kaishi 1978. vol. 6, pp. 874-881.

(56) References Cited

OTHER PUBLICATIONS

Avila, P., et al., Catalyst for NOx Removal in Nitric-Acid Plant Gaseous Effluents. Atmospheric Environment. 1993. vol. 27A, pp. 443-447.
Stieß, M. Mechanical Process Engineering—Particle Technology 1, Springer, 3rd edition 2009. Kapitel 2. Kennzeichnungen von Partikeln und dispersen Stoffsystemen [Chapter 2 Identification of particles and disperse Substance systems] pp. 9-95 in German with machine Translation.
Wikipedia. Color difference. Accessed Jun. 4, 2018. https://en.wikipedia.org/wiki/Color_difference (6 Pages).
German Office Action dated Feb. 17, 2021 for German Patent Application No. 10 2018 111 246.7 (5 pages in German with English translation).
Extended European Search Report mailed Jan. 26, 2024 for European Patent Application No. 23198011.1 (8 pages in German; 8 pages English Translation).
Chinese Office Action mailed Jan. 5, 2022 for Chinese Patent Application No. 201980031324.2 (5 page in Chinese; 5 pages English Translation).

\* cited by examiner

METHOD FOR COATING A WALL-FLOW FILTER

The present invention relates to a method for producing a coated wall-flow filter. The wall-flow filter is coated with a powder/gas aerosol.

The exhaust gas of internal combustion engines in motor vehicles typically contains the harmful gases carbon monoxide (CO) and hydrocarbons (HC), nitrogen oxides ($NO_x$), and possibly sulfur oxides ($SO_x$), as well as particulates that mostly consist of solid carbon-containing particles and possibly adherent organic agglomerates. These are called primary emissions. CO, HC, and particulates are the products of the incomplete combustion of the fuel inside the combustion chamber of the engine. Nitrogen oxides form in the cylinder from nitrogen and oxygen in the intake air when combustion temperatures exceed 1200° C. Sulfur oxides result from the combustion of organic sulfur compounds, small amounts of which are always present in non-synthetic fuels. Compliance in the future with statutory exhaust emission limits for motor vehicles applicable in Europe, China, North America, and India requires the extensive removal of said harmful substances from the exhaust gas. For the removal of these emissions, which are harmful to health and environment, from the exhaust gases of motor vehicles, a variety of catalytic technologies for the purification of exhaust gases have been developed, the fundamental principle of which is usually based upon guiding the exhaust gas that needs purification over a flow-through or wall-flow honeycomb body with a catalytically active coating applied thereto. The catalytic converter facilitates the chemical reaction of different exhaust gas components, while forming non-hazardous products, such as carbon dioxide, water, and nitrogen.

The flow-through or wall-flow honeycomb bodies just described are also called catalyst supports, carriers, or substrate monoliths, as they carry the catalytically active coating on their surface or in the walls forming this surface.

The catalytically active coating is often applied to the catalyst support in the form of a suspension in a so-called coating operation. Many such processes in this respect were published in the past by automotive exhaust-gas catalytic converter manufacturers (EP1064094B1, EP2521618B1, WO10015573A2, EP1136462B1, U.S. Pat. No. 6,478, 874B1, U.S. Pat. No. 4,609,563A, WO9947260A1, JP5378659B2, EP2415522A1, JP2014205108A2).

The operating mode of the internal combustion engine is decisive for the respectively possible methods of harmful substance conversion in the catalytic converter in each case. Diesel engines are usually operated with excess air, most spark-ignition engines with a stoichiometric mixture of intake air and fuel. "Stoichiometric" means that on average exactly as much air is available for combustion of the fuel present in the cylinder as is required for complete combustion. The combustion air ratio λ (A/F ratio; air/fuel ratio) sets the air mass $m_{L,actual}$ which is actually available for combustion in relation to the stoichiometric air mass $m_{L,st}$:

$$\lambda = \frac{m_{L,actual}}{m_{L,st}}$$

If λ<1 (e.g., 0.9), this means "air deficiency" and one speaks of a rich exhaust gas mixture; λ>1 (e.g., 1.1) means "excess air" and the exhaust gas mixture is referred to as lean. The statement λ=1.1 means that 10% more air is present than would be required for the stoichiometric reaction.

When lean-burn motor vehicle engines are mentioned in the present text, reference is thereby made mainly to diesel engines and to predominantly on average lean-burn spark-ignition engines. The latter are gasoline engines predominantly operating on average with a lean A/F ratio (air/fuel ratio). In contrast, most gasoline engines are operated with an on average stoichiometric combustion mixture. In this respect, the expression "on average" takes into consideration the fact that modern gasoline engines are not statically operated with a fixed air/fuel ratio (A/F ratio; λ value). It is rather the case that a mixture with a discontinuous course of the air ratio λ around λ=1.0 is predetermined by the engine control system, resulting in a periodic change of oxidizing and reducing exhaust gas conditions. This change in the air ratio λ is significant for the exhaust gas purification result. To this end, the λ value of the exhaust gas is regulated with a very short cycle time (approx. 0.5 to 5 Hz) and an amplitude Δλ of 0.005≤Δλ≤0.07 around the value λ=1.0. On average, the exhaust gas under such operating states should therefore be described as "on average" stoichiometric. In order to ensure that these deviations do not adversely affect the result of exhaust gas purification when the exhaust gas flows over the three-way catalytic converter, the oxygen-storing materials contained in the three-way catalytic converter balance out these deviations by absorbing oxygen from the exhaust gas or releasing it into the exhaust gas as needed (R. Heck et al., Catalytic Air Pollution Control-Commercial Technology, Wiley, 2nd edition 2002, p. 87). However, due to the dynamic mode of operation of the engine in the vehicle, further deviations from this state also occur at times. For example, under extreme acceleration or while coasting, the operating states of the engine, and thus of the exhaust gas, can be adjusted and can, on average, be hypostoichiometric or hyperstoichiometric. However, lean-burn spark-ignition engines have an exhaust gas which is predominantly, i.e., for the majority of the duration of the combustion operation, combusted with an air/fuel ratio that is lean on average.

The harmful gases carbon monoxide and hydrocarbons from a lean exhaust gas can easily be rendered harmless by oxidation on a suitable oxidation catalyst. In a stoichiometrically operated internal combustion engine, all three harmful gases (HC, CO, and NOx) can be eliminated via a three-way catalytic converter.

The reduction of nitrogen oxides to nitrogen ("denitrification" of the exhaust gas) is more difficult on account of the high oxygen content of a lean-burn engine. A known method is selective catalytic reduction (SCR) of the nitrogen oxides in a suitable catalytic converter or SCR catalytic converter for short. This method is currently preferred for the denitrification of lean-engine exhaust gases. The nitrogen oxides contained in the exhaust gas are reduced in the SCR method with the aid of a reducing agent metered into the exhaust tract from an external source. Ammonia is used as the reducing agent, which converts into nitrogen and water the nitrogen oxides present in the exhaust gas at the SCR catalytic converter. The ammonia used as reducing agent may be made available by metering an ammonia precursor compound, for example urea, ammonium carbamate, or ammonium formate, into the exhaust tract, and by subsequent hydrolysis.

Diesel particulate filters (DPF) or gasoline particulate filters (GPF) with and without additional catalytically active coating are suitable aggregates for removing the particulate emissions. In order to meet the legal standards, it is desirable for current and future applications for the exhaust gas aftertreatment of internal combustion engines to combine particulate filters with other catalytically active functionalities not only for reasons of cost but also for installation space reasons. The use of a particulate filter, whether catalytically coated or not, leads to a noticeable increase in the exhaust-gas back pressure in comparison with a flow-through support of the same dimensions and thus to a reduction in the torque of the engine or possibly to increased fuel consumption. In order to not increase the exhaust-gas back pressure even further, the amounts of oxidic support materials for the catalytically active noble metals of the catalytic converter or oxidic catalyst materials are generally applied in smaller quantities in the case of a filter than in the case of a flow-through support. As a result, the catalytic effectiveness of a catalytically coated particulate filter is frequently inferior to that of a flow-through monolith of the same dimensions.

There have already been some efforts to provide particulate filters which have good catalytic activity due to an active coating and yet have the lowest possible exhaust-gas back pressure. On the one hand, it has proven to be advantageous if the catalytically active coating is not present as a layer on the wall of a porous wall-flow filter, but instead the wall of the filter is to be interspersed with the catalytically active material (WO2005016497A1, JPH01-151706, EP1789190B1). For this purpose, the particle size of the catalytic coating is selected such that the particles penetrate into the pores of the wall-flow filters and can be fixed there by calcination.

A further functionality of the filter, which can be improved by a coating, is its filtration efficiency, i.e., the filtering effect itself. WO2011151711A1 describes a method by which a dry aerosol is applied to an uncoated or catalytically coated filter. The aerosol is provided by the distribution of a powdered high-melting metal oxide having a particle size of 0.2 µm to 5 µm and guided through the inlet end of a wall-flow filter by means of a gas stream. In this case, the individual particles agglomerate to form a bridged network of particles and are deposited as a layer on the surface of the individual inlet channels passing through the wall-flow filter. The typical powder loading of a filter is between 5 g and 50 g per liter of filter volume. It is expressly pointed out that it is not desirable to obtain a coating inside the pores of the wall-flow filter with the metal oxide.

A further method for increasing the filtration efficiency of catalytically inactive filters is described in WO2012030534A1. In this case, a filtration layer ("discriminating layer") is created on the walls of the flow channels of the inlet side by the deposition of ceramic particles via a particle aerosol. The layers consist of oxides of zirconium, aluminum, or silicon, preferably in fiber form ranging from 1 nm to 5 µm, and have a layer thickness greater than 10 µm, typically 25 µm to 75 µm. After the coating process, the applied powder particles are calcined in a thermal process.

A coating inside the pores of a wall-flow filter unit by spraying dry particles is described in U.S. Pat. No. 8,388,721B2. In this case, however, the powder should penetrate deeply into the pores. 20% to 60% of the surface of the wall should remain accessible to soot particles, thus open. Depending on the flow velocity of the powder/gas mixture, a more or less steep powder gradient between the inlet and outlet sides can be set.

The introduction of the powder into the pores, for example by means of an aerosol generator, is also described in EP2727640A1. Here, a non-catalytically coated wall-flow filter is coated using a gas stream containing, for example, aluminum oxide particles in such a way that the complete particles, which have a particle size of 0.1 µm to 5 µm, are deposited as a porous filling in the pores of the wall-flow filter. The particles themselves can realize a further functionality of the filter in addition to the filtering effect. For example, these particles are deposited in the pores of the filter in an amount greater than 80 g/l based on the filter volume. They fill in 10% to 50% of the volume of the filled pores in the channel walls. This filter, both loaded with soot and without soot, has an improved filtration efficiency compared to the untreated filter together with a low exhaust-gas back pressure of the soot-loaded filter. Nevertheless, there continues to be a need for particulate filters in which the filtration efficiency is optimized with respect to the exhaust-gas back pressure.

DE4225970C1 describes a method for the powder coating of catalyst supports. These are flow-through honeycomb bodies and are preferably moistened with special aqueous solutions prior to application of the powder/gas aerosol.

EP2502661A1 and EP2502662B1 mention further methods for the on-wall coating of filters by powder application. Corresponding apparatuses for applying a powder/gas aerosol to the filter, in which the powder applicator and the wall-flow filter are each separated so that air is sucked in through this space during coating, are also shown there. A further method in which a membrane ("trapping layer") is produced on the surfaces of the inlet channels of filters in order to increase the filtration efficiency of catalytically inactive wall-flow filters is described in patent specification U.S. Pat. No. 8,277,880B2. The filtration membrane on the surfaces of the inlet channels is produced by sucking a gas stream loaded with ceramic particles (for example, silicon carbide, cordierite) through. After application of the filter layer, the honeycomb body is fired at temperatures greater than 1000° C. in order to increase the adhesive strength of the powder layer on the channel walls.

The aim of the invention is to provide a corresponding method for producing particulate filters, in which the filter produced has a sufficient filtration efficiency coupled with the lowest possible increase in the exhaust-gas back pressure. The method should be simple and superior to prior-art methods in terms of occupational safety, robustness, and operating costs. In general, an improvement with regard to economic and ecological aspects is sought.

These and other objects which are obvious from the prior art are achieved by the specification of a method according to the below described features.

Figure 2:
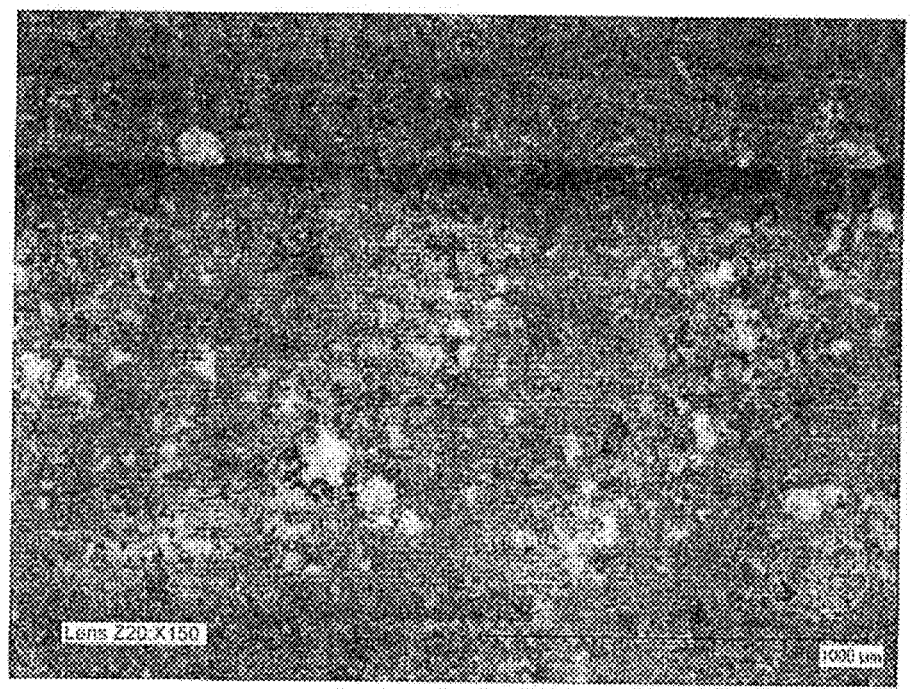
Figure 3:
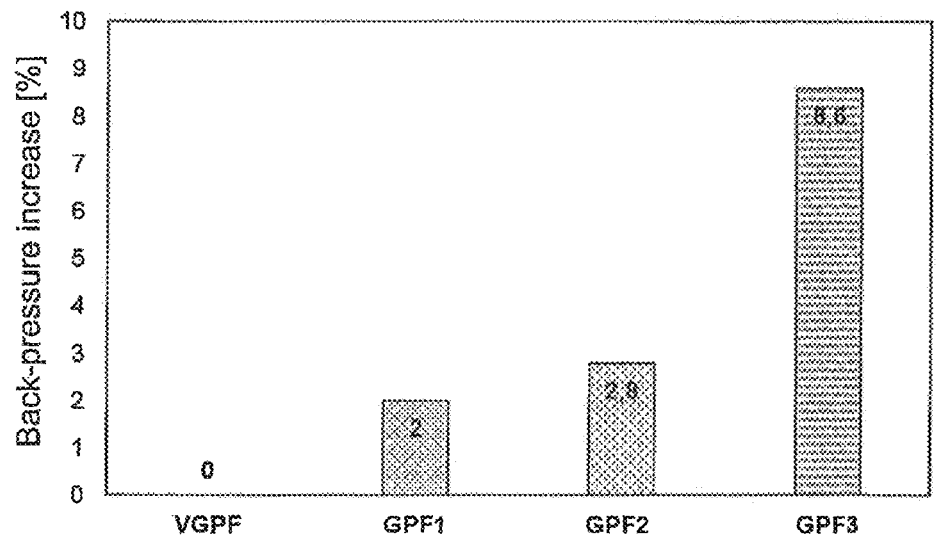

An extremely successful solution of the object at hand is attained in that in a method for producing a wall-flow filter for reducing the harmful substances in the exhaust gas of an internal combustion engine, a dry filter is specifically impinged on its inlet surface with a dry powder/gas aerosol which has at least one high-melting compound, such that the powder is precipitated in the pores of the filter walls, and wherein the powder is dispersed in the gas, then conducted into a gas stream and sucked into the inlet side of the filter without further supply of a gas. It is assumed that the dry atomization of sufficiently small powder particles in the dry state results in the particles in the gas stream not agglomerating. The impingement of the dry, catalytically coated filter with the dry powder/gas aerosol results in the powder particles being deposited in the pores of the filter following the flow of the gas (FIG. 2). An outstanding filtration efficiency of the, for example, catalytically coated filter together with a sufficiently low exhaust-gas back pressure is thereby achieved (FIGS. 3/4). The filters produced here and impinged with powder differ from those that are produced in the exhaust tract of a vehicle by ash deposition during operation. According to the invention, the filters are deliberately powder-sprayed with a specific, dry powder. As a result, the balance between filtration efficiency and exhaust-gas back pressure can be adjusted selectively right from the start.

All ceramic materials customary in the prior art can be used as wall-flow monoliths or wall-flow filters (filters, for short). Porous wall-flow filter substrates made of cordierite, silicon carbide, or aluminum titanate are preferably used. These wall-flow filter substrates have inflow and outflow channels, wherein the respective downstream ends of the inflow channels and the upstream ends of the outflow channels are offset against each other and closed off with gas-tight "plugs." In this case, the exhaust gas that is to be purified and that flows through the filter substrate is forced to pass through the porous wall between the inflow channel and outflow channel, which delivers an excellent particulate filtering effect. The filtration property for particulates can be designed by means of porosity, pore/radii distribution, and thickness of the wall. The porosity of the uncoated wall-flow filters is typically more than 40%, generally from 40% to 75%, particularly from 50% to 70% [measured according to DIN 66133, latest version on the date of application]. The average pore size of the uncoated filters is at least 7 µm, for example from 7 µm to 34 µm, preferably more than 10 µm, in particular more preferably from 10 µm to 25 µm, or very preferably from 15 µm to 20 µm [measured according to DIN 66134, latest version on the date of application]. The finished and powder-coated filters with a pore size of typically 10 µm to 20 µm and a porosity of 50% to 65% are particularly preferred.

The dispersion consisting of the gas and the powder may be prepared in accordance with the requirements of the person skilled in the art. For this purpose, a powder is commonly mixed with a gas. This can be done in various ways. Preferably, the dispersion of the powder is generated by at least one of the following measures:

Dispersion by means of compressed air
Dispersion by ultrasound
Dispersion by sieving
Dispersion by "in-situ milling"
Dispersion by a blower
Dispersion by means of expansion of gases
Dispersion in the fluidized bed.

These measures are explained separately further below. This mixture of gas and powder thus produced is then advantageously injected into an existing gas stream which carries the finely distributed powder into the inlet side of the wall-flow filter. This process is assisted by a suction device which is positioned in the pipeline downstream of the filter. This is in contrast to the device shown in FIG. 3 of U.S. Pat. No. 8,277,880B, in which the powder/gas aerosol is produced directly in the gas stream. The method according to the invention allows a much more uniform and good mixing of the gas stream with the powder/gas aerosol, which ultimately ensures an advantageous distribution of the powder particles in the filter in the radial and axial direction and thus helps to make uniform and control the deposition of the powder particles on the inlet surface of the filter.

The part of the filter formed by the inflow channels is considered the inlet side. The same applies mutatis mutandis to the outlet side. The inlet surface is formed by the wall surfaces of the inflow channels on the inlet side of the wall-flow filter.

All gases considered by the person skilled in the art for the present purpose can be used as gases for producing the aerosol and for inputting into the filter. The use of air is most particularly preferred. However, it is also possible to use other reaction gases which can develop either an oxidizing or a reducing activity with respect to the powder used. With certain powders, the use of noble gases may also prove advantageous. Mixtures of the listed gases are also conceivable.

Figure 5:
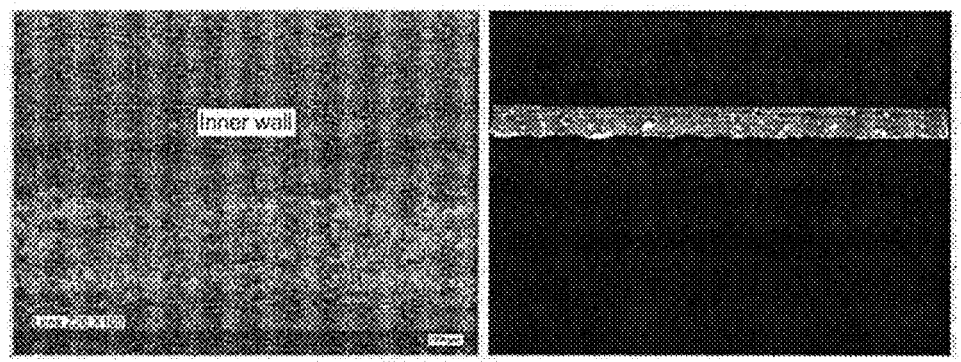

By means of the powder coating according to the invention, an increasing gradient with regard to the concentration of the powder in the longitudinal direction of the filter on and/or in the inlet surface from the inlet to the outlet side can accordingly be adjusted in a targeted manner. This gradient can be set and also varied by selected parameters. According to the invention, the term "increasing gradient" refers to the fact that the gradient of the powder concentration in the filter increases in the axial direction, from the inlet side to the outlet side, possibly from negative values to more positive values. In a preferred embodiment, there is more powder in the vicinity of the outlet plugs of the inlet channel and significantly less powder at the inlet of the filter. In order to describe the gradient, the filter is divided into three successive sections of equal length along its longitudinal axis. In a preferred form, the filter is coated with powder in an area near the inlet side and in an area in the middle of the filter at less than 40% of the wall surface of the inlet channel, while in an area near the outlet side, more than 40% of the wall surface of the inlet channel are coated with powder, wherein in a particularly preferred form, between 5% and 35% of the wall surface of the inlet channel are coated with powder in an area near the inlet side, between 8% and 38% in an area in the middle of the filter, and between 40% and 60% in an area near the outlet side, and in a very particularly preferred form, between 5% and 25% of the wall surface of the inlet channel are coated with powder in an area near the inlet side, between 8% and 30% in an area in the middle of the filter, and between 45% and 60% in an area near the outlet side. The degree of coating of the wall surface was determined by image analysis of light microscopy images (FIG. 5). Corresponding images of the inlet and outlet channels were taken in the process. In this type of analysis, the average color of the wall surface of the non-powder-coated outlet channel is determined as a reference. This reference value is subtracted from the corresponding image of the powder-coated areas in the inlet channel, wherein the color difference was defined according to CIE76 of the International Commission on Illumination with a lowest still distinguishable color difference of 2.33 (https://en.wikipedia.org/wiki/Color_difference#CIE76).

The gradient resulting from the powder coating is advantageous for a further increased filtration efficiency. In this case, the powder in particular fills in the large pores of the filter substrate. It is advantageous if in this process no "powder membrane," that is to say, no complete or continuous powder layer (for definition, see below), is formed on the filter wall. In one embodiment, the concentration gradient can be designed, for example, by varying the spraying rate such that more powder is deposited in the filter on the inlet side than in the middle of the filter and on the outlet side. In a more preferred embodiment, the concentration gradient can be designed such that more powder is deposited on the inlet side of the filter than in the middle of the filter and on the outlet side (at the other end of the filter) more than on the inlet side. Simulation results have provided the following picture in this respect (Table 1).

TABLE 1

Powder distribution across the filter at different space velocities of the gas:

| Channel length | Mass flow | | |
| --- | --- | --- | --- |
| | 10 m/s | 20 m/s | 40 m/s |
| 1/3 | 26% | 18% | 11% |
| 2/3 | 16% | 12% | 9% |
| 3/3 | 58% | 69% | 80% |

According to the simulation calculations, the last third of the substrate is mainly responsible (more than 50%) for the filtration property of the entire filter. An increased application of a powder coating on the last third of the filter additionally increases the back pressure there, this being due to the lower permeability, and the throughflow shifts more into the first two thirds of the filter. The powder-coated filter should therefore have a more rapidly increasing gradient of the coating from the inlet to the outlet in order to increase its filtration effect. This applies mutatis mutandis to the adjustment of an advantageous exhaust-gas back pressure. Accordingly, if necessary, a gradient of the concentration of the powder that increases less rapidly should be adjusted here.

Furthermore, a preferred development of the powder coating is characterized in that when filter substrates with square channels are used, the powder coating in the corners of the channels is thicker than in the corresponding center of the inlet surface. With exhaust-gas back pressure not increasing excessively, this has a further improved effect on the filtration efficiency. The term "the corresponding center" refers to the place in the center of the inlet channel between the corners of the channels, which has the same distance to the inlet end in the axial direction as the corresponding place in the corners of the channels.

The powder/gas aerosol should flow dry into a dry filter. Dry in the sense of the present invention accordingly means exclusion of the application of a liquid, in particular water. In particular, the production of a suspension of the powder in a liquid for spraying into a gas stream should be avoided. A certain moisture content may possibly be tolerable both for the filter and for the powder, provided that achieving the objective, the deposition of the powder in the pores, is not negatively affected. As a rule, the powder is free-flowing and sprayable by energy input. The moisture content of the powder or of the filter at the time of application of the powder should be less than 20%, preferably less than 10%, and very particularly preferably less than 5% (measured at 20° C. and normal pressure, ISO 11465, latest version on the date of application). If necessary, the relative moisture can be reduced further in a targeted manner by reproducibly dry and/or preheated gas, advantageously air. This helps to prevent powder particles from agglomerating in the gas stream. Alternatively and/or additionally, an ionized gas or air stream can be offered which also counteracts the agglomeration of the particles.

If the person skilled in the art would like to exclusively deposit powder in the pores of the walls of the wall-flow filter, that is to say to avoid a layer of the powder on the inlet surface of the filter, the person skilled in the art should not exceed a certain amount. Otherwise, the pores would fill up according to the invention and all further material would then only be able to deposit on the channel walls of the wall-flow filter. In this case, the upper limit of the loading of the wall-flow filter with the powder is, depending on the porosity and pore size of the wall-flow filter, a value at which the gas-permeable pores in the inlet surface are filled with the powder and no complete or continuous, contiguous powder layer has yet deposited on the inlet surfaces. Particularly preferably, the gas-permeable pores are filled with powder only up to their surface at the inlet surface. As a rule, the loading of the filter with the powder is no more than 50 g/l based on the filter volume. The value is preferably not more than 20 g/l, very particularly preferably not more than 10 g/l. A lower limit is naturally formed by the desired increase in filtration efficiency. In this context, it is particularly preferred if the amount of powder remaining in the filter is below 50 g/l and the powder coating has an increasing concentration gradient over the length of the filter from the inlet side to the outlet side. If a powder layer is also desired on the wall of the filter, more powder, optionally up to 100 g/l, preferably up to 80 g/l and preferably up to 70 g/l, can be deposited onto the filter.

Powders which are preferably used in the present invention for producing the aerosol are sufficiently familiar to the person skilled in the art. These are generally high-melting metal compounds, which are commonly used as support materials for catalysts in the automotive exhaust-gas field. Corresponding metal oxide, metal sulfate, metal phosphate, metal carbonate, or metal hydroxide powders or their mixtures are preferably used. Possible metals for the metal compounds are in particular those selected from the group of alkali metals, alkaline earth metals or earth metals, or transition metals. Such metals selected from the group of calcium, magnesium, strontium, barium, aluminum, silicon, titanium, zirconium, cerium are preferably used. As stated, these metals can preferably be used as oxides. Very particular preference is given to the use of cerium oxide, titanium dioxide, zirconium dioxide, silicon dioxide, aluminum oxide, or mixtures or mixed oxides thereof. Very particular preference is given to the use of an aerosol which is a mixture of air and one of these metal oxide powders. Here, the term "mixed oxide" (solid solutions of a metal oxide in at least one other) is also understood to mean the use of zeolites and zeotypes. In the context of the invention, zeolites and zeotypes are defined as in WO2015049110A1.

For better deposition of the soot particles, a sufficient, flowed-around surface is advantageous (see below). Preferably, the entire outer surface of the powder in the pores of the filter walls should be greater than 5 $m^2$ per liter, preferably greater than 10 $m^2$, and most preferably greater than 15 $m^2$ based on the outer filter volume in liters.

The total surface area of the particles SV is obtained from the particle size x according to:

$$S_V[m^{-1}] = 6 \cdot \int_{x\_min}^{x\_max} x_i^{-1} \cdot q_0(x_i) \cdot dx = 6 \cdot \sum_{min}^{max} \frac{\Delta Q_3(x_i)}{x_i}$$

(M. Stieß, Mechanical Process Engineering-Particle Technology 1, Springer, 3rd edition 2009, page 35), and the mass-related surface (M. Stieß, Mechanical Process Technology—Particle Technology 1, Springer, 3rd edition 2009, page 16) is obtained from the density of the particles ρ:

$$S_{m\left[\frac{m^2}{kg}\right]} = \frac{S_V}{\rho_{particles}}$$

-continued outer surface of the powder $S_{outer}[m^2] = S_m \cdot m_{powder}$ A loose cross-linking of the powder is advantageous for a low pressure loss and the simultaneously good adhesion in the pores of the substrate. This is achieved by powder with a defined particle size distribution. For the large pores, a proportion of larger particles must be present. The powder used here should have a broad, ideally an at least bimodal particle size distribution. The loose cross-linking of the powder in the pores of the substrate can advantageously be achieved in particular by powders having a multimodal or broad q3 particle size distribution. The multimodal particle distribution can be produced, for example, by mixing powders with different d50 values.

For the definition of the particle size distribution of the powder, a distinction is made, depending on the method by which the quantity of particles is determined, among other things between number-related (q0) and volume-related (q3) particle size distributions (M. Stieß, Mechanical Process Technology—Particle Technology 1, Springer, 3rd edition 2009, page 29).

Here, the size of the coarse particles (defined by the d90 value of the q3 particle size distribution, measured with the Tornado dry dispersion module of the company Beckmann according to the most recent ISO 13320-1 on the date of application) of the powder used should be less than or equal to 60% of the average volume-related q3 pore size (d50) of the filter used (measured according to DIN 66134, latest version on the date of application), preferably less than 50%. The average q3 particle size of the powder (d50) should be 5% to 30% of the average q3 pore size (d50) of the filter used, preferably 7% to 25%, and very preferably 10% to 25%. The d10 value of the q3 particle size distribution of the powder, which describes the fine fraction of the powder, should be 20% to 60% of the average q3 particle size (d50) of the powder, preferably 25% to 50%, and particularly preferably 25% to 40%. The d10 value of the number-related q0 grain size distribution should generally be higher than 0.05 µm, preferably higher than 0.08 µm, and particularly preferably higher than 0.1 µm.

Another feature of an advantageous filter according to the invention is that the embedded powder particles should be located mainly in the large and thus flowed-through pores of the filter. In order to minimize the increase in back pressure after powder-spraying, the powder volume corresponding to the summation of all individual particle volumes must not be excessive. In order to determine a suitable range for the powder volume and thus the appropriate amount of powder, regardless of the powder material, the powder volume is calculated from powder mass and porosity. From this, it follows that advantageously a maximum of 10%, preferably between 1% and 5%, and particularly preferably between 1.5% and 3%, of the total pore volume of the filter substrate should be filled with particles. The filled pore volume in % corresponds to the ratio of the sum of the volume of all powder particles to the pore volume of the filter to be coated.

Furthermore, a preferred development of the powder coating is characterized in that 5% to 35%, particularly preferably 5% to 25%, very particularly preferably 8% to 15%, of the total pore volume of the porous filter wall between inlet and outlet channels is filled with a loosely deposited powder. The degree of coating of the pore volume of the porous filter walls was determined by means of image analysis of light microscopy images ("wall interior" area in FIG. 5). Corresponding images of the inlet and outlet channels were taken in the process. In this type of analysis, the average color of the wall surface of the non-powder-coated outlet channel is determined as a reference. This reference value is subtracted from the corresponding image of the powder-coated areas in the wall, wherein the color difference was defined according to CIE76 of the International Commission on Illumination with a lowest still distinguishable color difference of 2.33 (https://en.wikipedia.org/wiki/Color_difference#CIE76).

In a preferred embodiment, the filter may have been catalytically coated prior to the application with the powder/gas aerosol. Here, catalytic coating is understood to mean the ability to convert harmful constituents of the exhaust gas from internal combustion engines into less harmful ones. The exhaust gas constituents NOx, CO, and HC and particulate matter should be mentioned here in particular. This catalytic activity is provided according to the requirements of the person skilled in the art by a coating of the wall-flow filter with a catalytically active material. The term "coating" is accordingly to be understood to mean the application of catalytically active materials to the wall-flow filter. The coating assumes the actual catalytic function. In the present case, the coating is carried out by applying a correspondingly low-viscosity aqueous suspension, also called washcoat, or solution of the catalytically active components to the wall-flow filter, see, for example, according to EP1789190B1. After application of the suspension/solution, the wall-flow filter is dried and, if applicable, calcined at an increased temperature. The catalytically coated filter preferably has a loading of 20 g/l to 200 g/l, preferably 30 g/l to 150 g/l. The most suitable amount of loading of a filter coated in the wall depends on its cell density, its wall thickness, and the porosity. In the case of common medium-porous filters (<60% porosity) with, for example, 200 cpsi cell density and 8 mil wall thickness, the preferred loading is 20 g/l to 50 g/l (based on the outer volume of the filter substrate). Highly porous filters (>60% porosity) with, for example, 300 cpsi and 8 mil have a preferred load of 25 g/l to 150 g/l, particularly preferably 50 g/l to 100 g/l.

In principle, all coatings known to the person skilled in the art for the automotive exhaust-gas field are suitable for the present invention. The catalytic coating of the filter may preferably be selected from the group consisting of three-way catalyst, SCR catalyst, nitrogen oxide storage catalyst, oxidation catalyst, soot-ignition coating. With regard to the individual catalytic activities coming into consideration and their explanation, reference is made to the statements in WO2011151711A1. Particularly preferably, this has a catalytically active coating of at least one metal-ion-exchanged zeolite, cerium/zirconium mixed oxide, aluminum oxide, and palladium, rhodium, or platinum, or combinations of these noble metals.

According to the invention, the powder can be used as such as described above. However, the use of dry powder which supports a catalytic activity with regard to exhaust-gas aftertreatment is also conceivable. Accordingly, the powder itself can likewise be catalytically active with regard to reducing harmful substances in the exhaust gas of an internal combustion engine. Suitable for this purpose are all activities known to the person skilled in the art, such as TWC, DOC, SCR, LNT, or soot-burn-off-accelerating catalysts. The powder will generally have the same catalytic activity as an optionally subsequent catalytic coating of the filter. This further increases the overall catalytic activity of the filter as compared to filters not coated with catalytically active powder. In this respect, it may be possible to use aluminum oxide, for example, impregnated with a noble metal for producing the powder/gas aerosol. It is likewise conceivable for catalytically active material to be used for the SCR reaction. Here, the powder may consist, for example, of zeolites or zeotypes exchanged with transition metal ions. Very particular preference is given in this context to the use of zeolites exchanged with iron and/or copper. CuCHA (copper-exchanged chabazite; http://europe.iza-structure.org/IZA-SC/framework.php?STC=CHA) or CuAEI (http://europe.iza-structure.org/IZA-SC/framework.php?STC=AEI) are extremely preferably used as material for producing the powder/gas aerosol.

In order to be able to draw the powder sufficiently deeply into the pores at the surface of the filter wall on the inlet side of the filter, a certain suction power is needed. In orientation experiments for the respective filter and the respective powder, the person skilled in the art can form an idea for himself in this respect. It has been found that the aerosol (powder/gas mixture) is preferably sucked through the filter at a rate of 5 m/s to 50 m/s, more preferably 10 m/s to 40 m/s, and very particularly preferably 15 m/s to 35 m/s. This likewise achieves an advantageous adhesion of the applied powder. The pressure drop across the filter is generally >100 mbar, preferably >150 mbar, and very particularly preferably >200 mbar when the aerosol is sucked in. In the case of poorly adherent powders, aftertreatment with a bonding agent may help. Compaction of the powder in the pores of the filter can also be achieved by means of a sufficiently high suction pulse (>200 mbar) at the end of the coating procedure.

In a preferred embodiment, at least one partial gas stream is extracted downstream of the suction device and, before the powder addition, is added back to the gas stream which has been drawn through the filter. The powder is thereby metered into an already heated air stream. The suction blowers for the necessary pressures generate approximately 70° C. exhaust air temperature since the installed suction power is preferably >20 KW. In an energetically optimized manner, the waste heat of the suction blower is used to heat the supply air in order to reduce the relative humidity of the supply air. This in turn reduces the adhesion of the particles to one another and to the inlet plugs. The deposition process of the powder can thus be better controlled.

In the present method for producing a wall-flow filter, a gas stream is charged with a powder/gas aerosol and sucked into a filter. This ensures that the powder can be distributed sufficiently well in the gas stream for it to be able to penetrate into the inlet channels of the filter on the inlet side of the wall-flow filter. Homogeneous mixing of the powder in the gas/air requires intensive mixing. For this purpose, diffusers, venturi mixers, and static mixers are known to the person skilled in the art. Particularly suitable for the powder coating process are mixing devices which avoid powder deposits. Diffusers and venturi tubes are thus preferably used for this process. The introduction of the dispersed powder into a fast-rotating rotating flow with a high turbulence has also proven effective.

In order to achieve an advantageously uniform distribution of the powder over the cross section of the filter, the gas transporting the powder should have a piston flow (if possible, the same velocity over the cross section) when impinging on the filter. This is preferably set by an accelerated flow upstream of the filter. As is known to the person skilled in the art, a continuous reduction of the cross section without abrupt changes causes such an accelerated flow, described by the continuity equation. Furthermore, it is also known to the person skilled in the art that the flow profile is thus more closely approximated to a piston profile. For the targeted change of the flow, built-in components, such as sieves, rings, disks, etc. below and/or above the filter can be used.

In a further advantageous embodiment of the present invention, the apparatus for powder coating has one or more devices (turbulators, vortex generators) with which the gas stream carrying the powder/gas aerosol can be vortexed prior to impingement on the filter. As an example in this respect, corresponding sieves or grids can be used, which are placed at a sufficient distance upstream of the filter. The distance should not be too large or small so that sufficient vortexing of the gas stream directly upstream of the filter is achieved. The person skilled in the art can determine the distance in simple experiments. The advantage of this measure is explained by the fact that powder constituents do not deposit on the inlet plugs of the outlet channels and all the powder can penetrate into the inlet channels. Accordingly, it is preferred according to the invention if the powder is vortexed before flowing into the filter in such a way that deposits of powder on the inlet plugs of the wall-flow filter are avoided as far as possible. A turbulator or turbulence or vortex generator in aerodynamics refers to equipment which causes an artificial disturbance of the flow. As is known to the person skilled in the art, vortices (in particular microvortices) form behind rods, gratings, and other flow-interfering built-in components at corresponding Re numbers. Known is the Karman vortex street (H. Benard, C. R. Acad. Sci. Paris. Ser. IV 147, 839 (1908); 147, 970 (1908); T. von Karman, Nachr. Ges. Wiss. Göttingen, Math. Phys. Kl. 509 (1911); 547 (1912)) and the wake turbulence behind airplanes which can cover roofs. In the case according to the invention, this effect can be intensified very particularly advantageously by vibrating self-cleaning sieves (so-called ultrasonic screens) which advantageously move in the flow. Another method is the disturbance of the flow through sound fields, which excites the flow to turbulences as a result of the pressure amplitudes. These sound fields can even clean the surface of the filter without flow. The frequencies may range from ultrasound to infrasound. The latter measures are also used for pipe cleaning in large-scale technical plants.

Preferably, the powder is then deposited according to the invention in the accessible pores of the filter walls, possibly without forming a partial or continuous layer on the filter wall in the inlet channels (FIG. 2). As described above, an increasing concentration gradient of the powder over the axial length of the carrier can advantageously be influenced, for example, by using different flow breakers in the aerosol gas stream upstream of the inlet side of the carrier and also by adjusting the coating parameters, such as the flow velocity of the carrier gas and atomizer gas. Even the physical parameters of the powder used, such as the bulk density, residual moisture content, and particle size distribution, can be used in a targeted manner to create the desired gradient described above. Addition may be continuous until the sufficient amount of powder is deposited in the filter. A pulsed addition is also possible such that the powder charged with compressed gas is metered periodically into the gas stream sucked through the filter until the sufficient amount of powder has been deposited in the filter. Apparatuses and methods in which such a metering of a powder is described are appreciated in the prior art (DE4225970C1, U.S. Pat. No. 8,495,968B2, U.S. Pat. No. 8,632,852B2, U.S. Pat. No. 8,534,221B2, U.S. Pat. No. 8,277,880B2; see also above).

Advantageous methods for producing the powder/gas aerosol were already mentioned above. In principle, the person skilled in the art is free to select a method for producing the powder/gas aerosol. For example, the aerosol methods mentioned in the following are advantageous.

Dispersion with Compressed Air:

The production of powder/gas aerosols by means of compressed air is sufficiently known to the person skilled in the art. By way of example, such powder/gas mixtures are used in inhalers or powder fire extinguishers and in sandblasting blowers, for example described in U.S. Pat. No. 108,408. In principle, the mixtures are produced here with the aid of pressure, in particular compressed air. Dispersion can occur due to flow stresses (acceleration flow, shear field, turbulent flow). The dispersion energy is determined by the gas velocity, which is a function of the applied pressure and the nozzle diameter. Such apparatuses can also be found in US20010003351A1 or U.S. Pat. No. 6,220,791B1 and literature cited therein.

Dispersion by Ultrasound:

The production of a defined particle size distribution in the gas phase can also be effected by an ultrasonic field with advancing or standing wave. WO05022667A2 describes the dispersion of powder in an ultrasonic field. The addition of the powder to the ultrasonic field field can take place in a free fall (FIG. 8) or by the addition into a sieve located in the ultrasonic field (FIG. 9), by a predispersed introduction with the aid of a sieve in a free fall (FIG. 10) or by an air flow.

Figure 11:
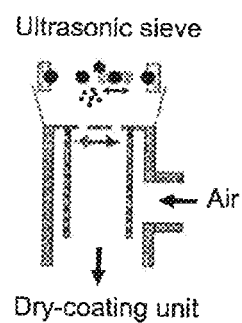

Dispersion by Sieving:

The powder can be dispersed with the aid of an air jet sieve (DE102010015364A1; DE19921409A1 and literature cited therein) and/or an ultrasonic sieve (FIG. 11). The powder can be deagglomerated by means of an ultrasonic sieve base (US sieve) placed above the air inlet. In a US screen, the sieve grating oscillates at a frequency in the kHz range. The amplitudes in this case lie in the µm range. As a result of the movement of the sieve grating, impact is exerted on the agglomerates placed on the sieve by the sieve grating. This stress leads to deagglomeration. The dispersion energy is determined by the kinetic energy of the sieve grating, which is a function of the amplitude and the oscillation frequency. After the stress, the deagglomerated particles fall through the sieve base and are fed to the gas stream.

Dispersion by "In-Situ Milling":

The powder can be dispersed, for example, in a jet mill. A plurality of nozzles is arranged tangentially in a milling chamber, wherein the nozzles can be operated critically (with supersonic flow). The powder is metered into the milling chamber and accelerated in the gas streams. The dispersion takes place on the basis of particle-particle impacts. The dispersion energy is mainly determined by the collision speed of the agglomerates. The advantage of this mill is the low tendency to contaminate the particulate material with material from the mill since the comminution takes place by particle-particle interactions.

The powder can also be dispersed in a pin mill if the hardness of the powder allows. The powder is added to the milling chamber in which a disk is rotated on which metallic milling pins are mounted. In this case, deagglomeration is caused by the collision of the agglomerates with the pins. The dispersion energy is determined here by the circumferential speed (rotational speed x disk diameter). A prerequisite for the collision with the milling pins is a sufficient inertia of the agglomerates, which can be described by the Stokes number/inertia parameters for the collision conditions.

Figure 12:
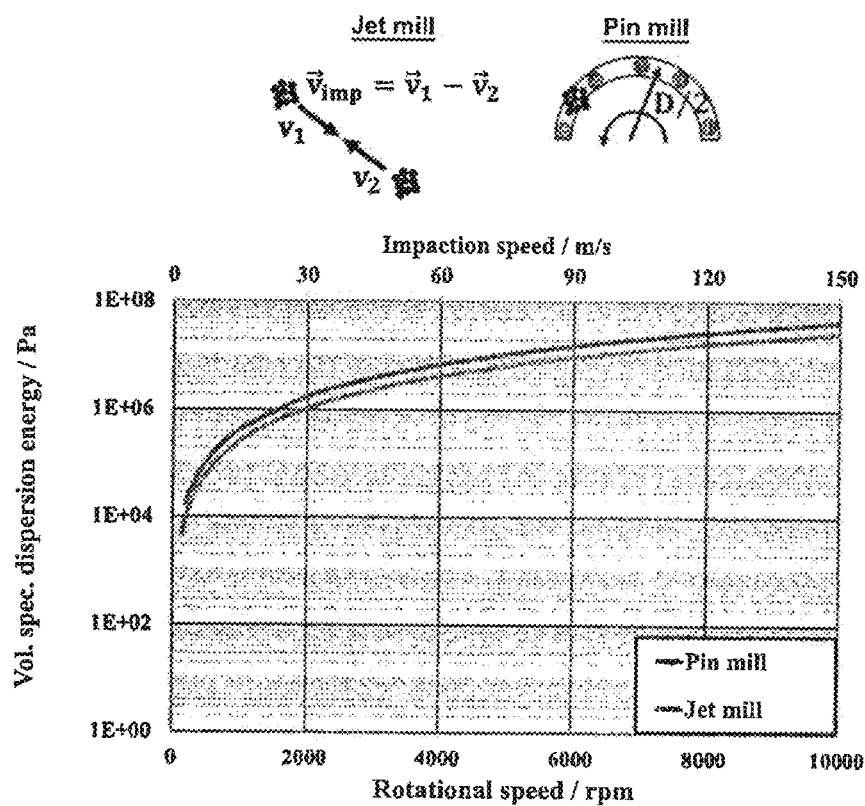

FIG. 12 shows the dispersion energies in a jet and pin mill. With a corresponding selection of the operating parameters, similar dispersion energies are achieved in both mills.

The variable operating parameter in the jet mill is the impaction speed of the particles, which is regulated via the nozzle pilot pressure. In the pin mill, the variable operating parameter is the rotational speed. Even a dynamic classifier could be used for powders that are very easy to disperse. The dispersion works according to the same principle as in a pin mill. In addition to dispersing through the collision with the visual vanes, classification of the agglomerates takes place based on the flow guidance. Agglomerates with a size above the parting particle remain in the open space.

The dispersion energy is determined by the circumferential speed of the classifier wheel. A prerequisite for the collision with the classifying blades is a sufficient inertia of the agglomerates, which is described by the Stokes number/inertia parameters for the collision conditions (flow conditions and geometry of the blades).

Figure 13:
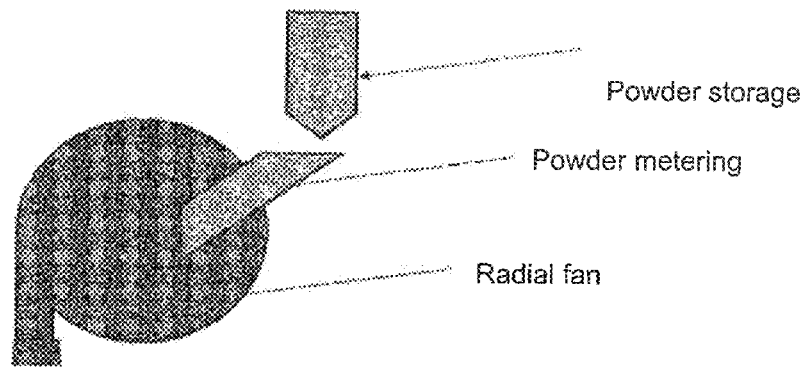

Dispersion by Blower:

In this embodiment, the powder is metered into a blower (FIG. 13). In the blower, the agglomerates collide with the rotors, as a result of which the powder is stressed, which leads to dispersion. The dispersion energy is determined here by the circumferential speed (rotational speed x rotor diameter) and the radial point of incidence on the rotors. A prerequisite for the collision with the rotor blades is a sufficient inertia of the agglomerates, which is described by the Stokes number/inertia parameters for the collision conditions. In addition to the collision stress, due to the velocity gradients and turbulences in the apparatuses, flow stresses act, which likewise lead to dispersion. The dispersion energy caused by the flow stresses is determined by the circumferential speed and rotor design. The inertia of the particles is insignificant for the dispersion in the generated flow field.

Dispersion by Expansion:

Particles in the gas phase can also be dispersed by depressurizing the aerosol, which is in an overpressure, via a nozzle. The dispersion takes place as a result of shearing and acceleration forces in the gas stream, wherein the dispersion energy is determined by the applied pressure difference. Furthermore, a supercritical pressure ratio can be set. When the critical pressure ratio is exceeded, a supersonic flow is established downstream of the nozzle. In the case of supercritical expansion, shock waves form in which additional stresses act on the agglomerates, as a result of which dispersion is likewise achieved.

Dispersion by Fluidized Bed

In this embodiment, the powder is placed in a fluidized bed and dispersed when flowed through with gas. In this case, the dispersion is caused by particle-particle impacts. The dispersion energy is determined by the relative velocity of the particles, wherein the relative velocity of the particles is generated by the gas flowing through. Furthermore, larger spheres can be added to the fluidized bed and serve as an impacting object, the dispersion then being determined by the relative velocity of the sphere particles. Moreover, additional nozzles from which gas flows out at high velocities can be arranged in the fluidized bed, wherein various arrangements are possible. This is known to the person skilled in the art as fluidized-bed jet milling. Also taken into account in this connection are additional solid build-in components which serve as an impacting surface, which is referred to as jet impactor-assisted fluidized bed.

Further dispersion methods not mentioned here can likewise be used by the person skilled in the art. As already described, the powder is first converted into a powder/gas aerosol and then conducted into a gas stream. The gas stream then carries the finely distributed powder into the inlet side of the wall-flow filter. In this case, the powder is then deposited in the pores of the channel walls. This is essentially achieved by the powder being dry in the sense of the invention during the impingement of the wall-flow filter. This is optionally mixed with the ambient air and applied mixed to the filter. Without being bound by any particular theory, it is assumed that this manner of application of the powder counteracts caking or agglomeration of the individual powder constituents prior to their deposition. This preserves the original particle size of the powder particles in the aerosol. In this way, it is then possible to deposit the powder particles in the wall pores of the wall-flow filter and not, as described in the prior art, onto the pores and onto the walls of the inlet channels. A loose mixture of powder particles with few contact points and not highly compacted is present in the pores. This can be seen in contrast to the drying of suspensions. A high-temperature treatment (sintering at e.g. >1000° C.) is not required in the present case.

The wall-flow filter produced according to the invention exhibits an excellent filtration efficiency with only a moderate increase in exhaust-gas back pressure as compared to a wall-flow filter in the fresh state that has not been impinged by powder. The wall-flow filter according to the invention preferably exhibits an increase in filtration efficiency of at least 5% absolute, preferably at least 20% absolute, and very particularly preferably at least 40% absolute, at a relative increase in the exhaust-gas back pressure of the fresh wall-flow filter of at most 40%, preferably at most 20%, and very particularly preferably at most 10%, as compared to a fresh filter coated with catalytically active material but not treated with powder. As stated, the powder deposits at least initially into the open pores of the filter and forms a porous matrix there. The slight increase in back pressure is probably attributable to the fact that the cross section of the channels at the inlet side is not reduced by the application, according to the invention, of a powder to the filter. The porous powder matrix then does not lead to an excessive exhaust-gas back-pressure increase.

In a further aspect, the present invention relates to a device for producing a wall-flow filter for reducing the harmful substances in the exhaust gas of an internal combustion engine by means of the method according to the invention, which is characterized in that it has:
 a unit for dispersing powder in a gas;
 a unit for mixing the dispersion with an existing gas stream;
 a filter-receiving unit designed to allow the gas stream to flow through the filter without further supply of a gas;
 a suction-generating unit that maintains the gas stream through the filter; and
 optionally, a unit for generating vortices upstream of the filter so that a deposition of powder on the inlet plugs of the filter is prevented as far as possible.

The preferred embodiments for the method and the cited advantages also apply mutatis mutandis to the device. Reference is explicitly made in this respect to what was said above about the method. A preferred embodiment of the device is shown in FIG. 1.

The wall-flow filters produced in this way are used to reduce harmful exhaust gases of an internal combustion engine. In principle, all catalytic exhaust-gas aftertreatments (see above) coming into consideration for this purpose to the person skilled in the art and having a filter can serve for application purposes, but in particular those in which the filter is in an exhaust system together with one or more catalytically active aggregates selected from the group consisting of nitrogen oxide storage catalysts, SCR catalysts, three-way catalysts, and diesel oxidation catalysts. The use of the filters according to the invention for the treatment of exhaust gases of a stoichiometrically operated internal combustion engine is preferred.

Correspondingly produced wall-flow filters which have a catalytic coating and which eliminate nitrogen oxides and hydrocarbons and carbon monoxide (HC, CO, and NOx) in the stoichiometric exhaust gas ($\lambda=1$ conditions) are usually referred to as catalyzed gasoline particulate filters (cGPF). Also of interest are such that can convert the oxides of the nitrogen under rich exhaust gas conditions and CO and HC under lean conditions. They for the most part contain platinum group metals, such as Pt, Pd, and Rh, as catalytically active components, wherein Pd and Rh are particularly preferred. The catalytically active metals are often deposited with high dispersion on large-surface oxides of aluminum, zirconium, and titanium, or mixtures thereof, which may be stabilized by additional transition elements, such as lanthanum, yttrium, praseodymium, etc. Three-way catalysts also contain oxygen-storing materials (for example, Ce/Zr mixed oxides; see below). For example, a suitable three-way catalytic coating is described in EP1181970B1, EP1541220B1, WO2008113445A1, WO2008000449A2, which are referenced here.

Various catalytic functions may also be combined with one another. The three-way catalysts mentioned above may, for example, be equipped with a nitrogen oxide storage functionality (TWNSC). As stated above, these catalysts consist of materials that, under stoichiometric exhaust gas conditions, impart to the catalyst the function of a three-way catalyst, and that have a function for the storage of nitrogen oxides under lean exhaust-gas conditions. These stored nitrogen oxides are regenerated during brief rich operating phases in order to restore storage capability. The manufacturing of a corresponding TWNSC preferably takes place by assembling materials that are used for the construction of a three-way catalyst and a nitrogen oxide storage catalyst. The two functions of the TWNSC that are described here may in this case be present on a carrier, blended with or separate from one another in different layers or zones. A particularly preferred embodiment of such a catalyst is described in WO2010097146A1 or WO2015143191A1, for example. However, during the regeneration, an air/fuel mixture is preferably maintained which corresponds to a $\lambda$ of 0.8 to 1. This value lies particularly preferably between 0.85 and 0.99, and very particularly preferably between 0.95 and 0.99.

A further application is the removal of nitrogen oxides from lean exhaust gas mixtures by means of the SCR method. For this SCR treatment of the preferably lean exhaust gas, ammonia or an ammonia precursor compound is injected into the exhaust gas and both are conducted over a SCR-catalytically coated wall-flow filter produced according to the invention. The temperature above the SCR filter should be between 150° C. and 500° C., preferably between 200° C. and 400° C. or between 180° C. and 380° C. so that reduction can take place as completely as possible. A temperature range of 225° C. to 350° C. for the reduction is particularly preferred. Furthermore, optimum nitrogen oxide conversions are only achieved when there is a molar ratio of nitrogen monoxide to nitrogen dioxide ($NO/NO_2=1$) or the $NO_2/NOx$ ratio=0.5 (G. Tuenter et al., Ind. Eng. Chem. Prod. Res. Dev. 1986, 25, 633-636; EP1147801B1; DE2832002A1; Kasaoka et al., Nippon Kagaku Kaishi (1978), 6, 874-881; Avila et al., Atmospheric Environment (1993), 27A, 443-447). Optimum conversions starting at 75% conversion are already achieved at 250° C. with simultaneous optimum selectivity with respect to nitrogen in accordance with the stoichiometry of the reaction equation $$2NH_3 + NO + NO_2 \rightarrow 2N_2 + 3H_2O$$

only with a NO$_2$/NOx ratio of around 0.5. This applies not only to SCR catalysts based on metal-exchanged zeolites but to all common, i.e., commercially available, SCR catalysts (so-called fast SCRs). A corresponding NO:NO$_2$ content may be achieved with oxidation catalysts positioned upstream of the SCR catalyst.

Wall-flow filters having an SCR-catalytic function are referred to as SDPF. These catalysts frequently possess a function for storing ammonia and a function whereby nitrogen oxides can react with ammonia to form harmless nitrogen. An NH$_3$-storing SCR catalyst can be designed in accordance with types known to the person skilled in the art. In the present case, this is a wall-flow filter which is coated with a material catalytically active for the SCR reaction and in which the catalytically active material, commonly called the "washcoat," is present in the pores of the wall-flow filter. However, along with the—in the proper sense of the term—'catalytically active' component, this wall-flow filter may also contain other materials, such as binders consisting of transition metal oxides, and large-surface carrier oxides, such as titanium oxide, aluminum oxide, in particular gamma-Al$_2$O$_3$, zirconium oxide, or cerium oxide. Also suitable as SCR catalysts are those that are made up of one of the materials listed below. However, it is also possible to use zoned or multilayer arrangements or even arrangements consisting of a plurality of components one behind the other (preferably two or three components) with the same materials as the SCR component or different materials. Mixtures of different materials on a substrate are also conceivable.

The actual catalytically active material used in this regard is preferably selected from the group of transition-metal-exchanged zeolites or zeolite-like materials (zeotypes). Such compounds are sufficiently familiar to the person skilled in the art. Preferred in this regard are materials from the group consisting of levynite, AEI, KFI, chabazite, SAPO-34, ALPO-34, zeolite B, and ZSM-5. Zeolites or zeolite-like materials of the chabazite type, in particular CHA or SAPO-34, as well as LEV or AEI are particularly preferred. In order to ensure sufficient activity, these materials are preferably provided with transition metals from the group consisting of iron, copper, manganese, and silver. It should be mentioned in this respect that copper is especially advantageous. The ratio of metal to framework aluminum or, in the case of SAPO-34, the ratio of metal to framework silicon is normally between 0.3 and 0.6, preferably 0.4 to 0.5. The person skilled in the art knows how to equip the zeolites or the zeolite-like materials with the transition metals (EP0324082A1, WO2013092707A1, WO2012175409A1, and the literature cited therein) in order to be able to deliver good activity with respect to the reduction of nitrogen oxides with ammonia. Furthermore, vanadium compounds, cerium oxides, cerium/zirconium mixed oxides, titanium oxide, and tungsten-containing compounds, and mixtures thereof can also be used as catalytically active material.

Materials, which in addition have proven themselves to be advantageous for the application of storing NH$_3$, are known to the person skilled in the art (US20060010857A1, WO2004076829A1). In particular, microporous solid materials, such as so-called molecular sieves, are used as storage materials. Such compounds, selected from the group consisting of zeolites, such as mordenites (MOR), Y-zeolites (FAU), ZSM-5 (MFI), ferrierites (FER), chabazites (CHA), and other "small pore zeolites," such as LEV, AEI, or KFI, and β-zeolites (BEA), as well as zeolite-like materials, such as aluminum phosphate (AlPO) and silicon aluminum phosphate SAPO or mixtures thereof, can be used (EP0324082A1). Particularly preferably used are ZSM-5 (MFI), chabazites (CHA), ferrierites (FER), ALPO- or SAPO-34, and β-zeolites (BEA). Especially preferably used are CHA, BEA, and AlPO-34 or SAPO-34. Extremely preferably used are materials of the LEV or CHA type, and here maximally preferably CHA or LEV or AEI. Insofar as a zeolite or a zeolite-like compound as just mentioned above is used as catalytically active material in the SCR catalyst, the addition of further NH$_3$-storing materials can, advantageously, naturally be dispensed with. Overall, the storage capacity of the ammonia-storing components used can, in a fresh state at a measuring temperature of 200° C., be more than 0.9 g NH$_3$ per liter of catalyst volume, preferably between 0.9 g and 2.5 g NH$_3$ per liter of catalyst volume, and particularly preferably between 1.2 g and 2.0 g NH$_3$/liter of catalyst volume, and very particularly preferably between 1.5 g and 1.8 g NH$_3$/liter of catalyst volume. The ammonia-storing capacity can be determined using synthesis gas equipment. To this end, the catalyst is first conditioned at 600° C. with NO-containing synthesis gas to fully remove ammonia residues in the drilling core. After the gas has been cooled to 200° C., ammonia is then metered into the synthesis gas at a space velocity of, for example, 30,000 h$^{-1}$ until the ammonia storage in the drilling core is completely filled, and the ammonia concentration measured downstream of the drilling core corresponds to the starting concentration. The ammonia-storing capacity results from the difference between the amount of ammonia metered overall and the amount of ammonia measured on the downstream side based on the catalyst volume. The synthesis gas is here typically composed of 450 ppm NH$_3$, 5% oxygen, 5% water, and nitrogen.

In the context of the invention, the feature of the absence of a contiguous powder layer on the walls of the filter is to be understood to mean that there is at least no completely continuous layer of powder on the inlet surfaces of the filter (FIG. 2). Powder coating of the filter is advantageously stopped when this contiguous layer is just beginning to form. It is also more preferable to prevent the powder from forming hillocks. It is very advantageous to deposit a quantity of powder which just fills the gas-permeable pores up to the inlet surface. The amount of powder that can thus be deposited depends on the type of powder and the volume of the available pores and can be determined by the person skilled in the art in preliminary experiments under the given boundary conditions.

The feature that the powder is dispersed in the gas, then guided into a gas stream and drawn into the inlet side of the filter without further supply of a gas is to be understood to mean that, after the introduction of the powder/gas aerosol into the gas stream passing through the filter, the gas stream no longer changes its composition. Consequently, no further inflow of a gas, for example ambient air, to the gas stream resulting in this way takes place so that states as uniform as possible of the powder/gas aerosol prevail when the latter penetrates into the filter. It is inherent to this method that the gas stream into which the powder/gas aerosol is introduced is fixed in its physical parameters, that is to say no longer changeable, and this is already given before the addition of the powder/gas aerosol.

By means of the filter according to the invention, it is possible to obtain a high filtration efficiency, in particular for small-particulate soots, such as those emitted from spark-ignition engines. In this case, the exhaust-gas back pressure does not increase unduly. The filters, if catalytically active, exhibit excellent catalytic activity. The exhaust-gas back pressure and the filtration efficiency can be specifically adapted to customer requirements. A correspondingly produced wall-flow filter was not yet known from the prior art.

FIGURES

Figure 4:
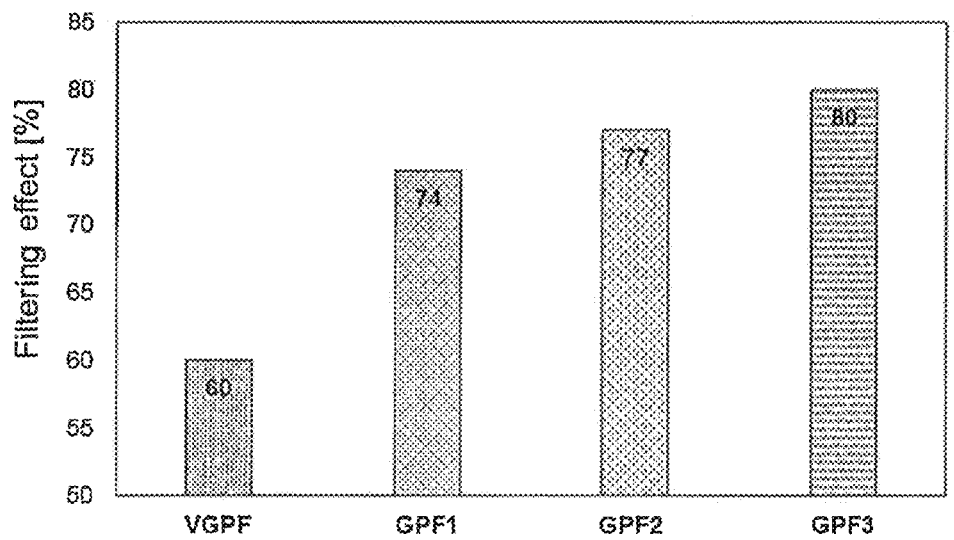
Figure 6:
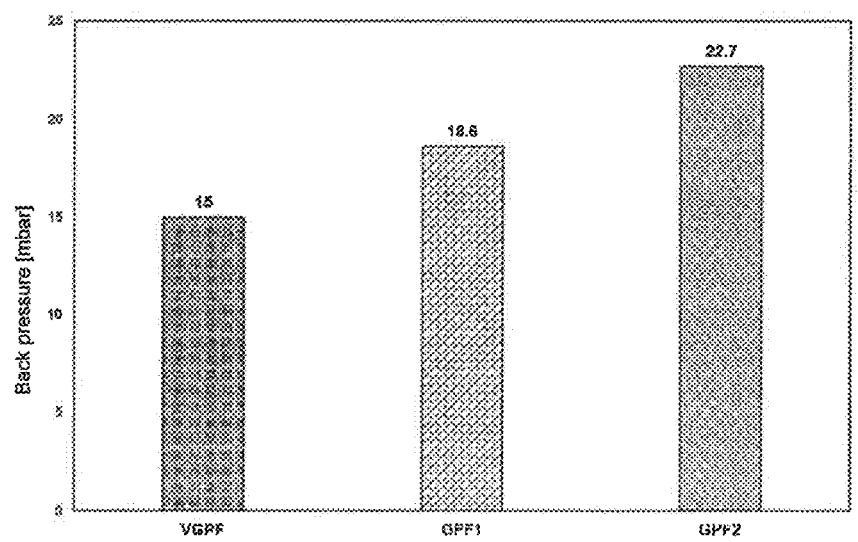
Figure 7:
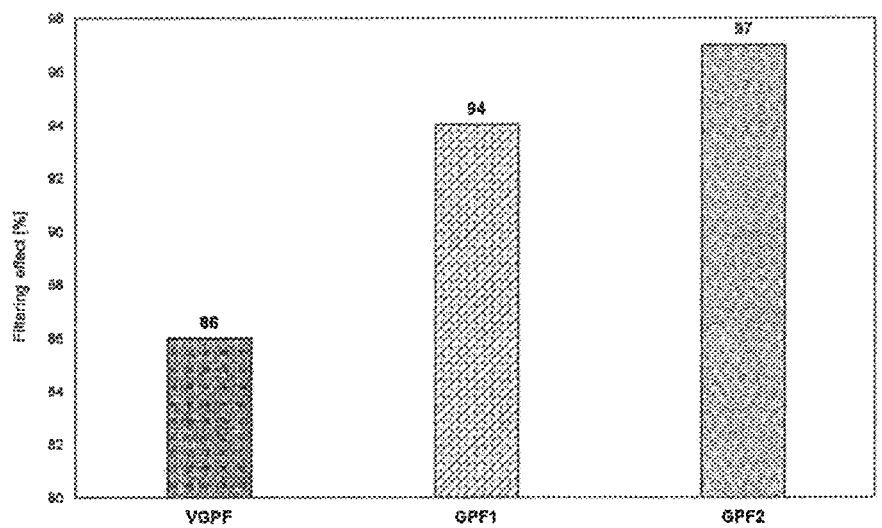
Figure 8:
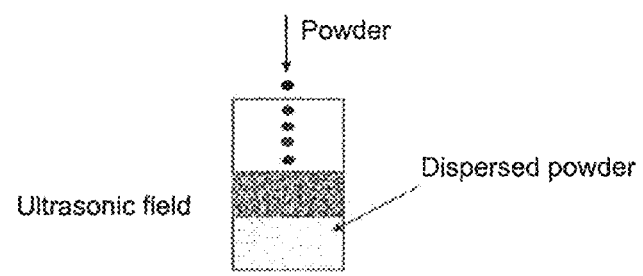
Figure 9:
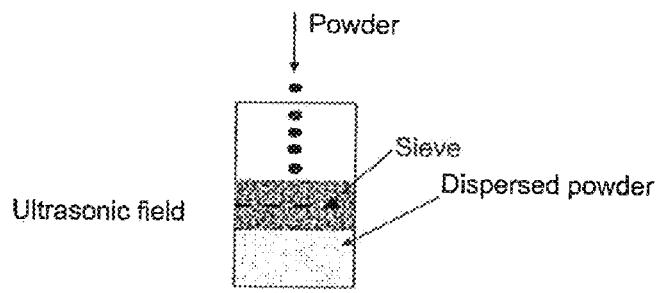
Figure 10:
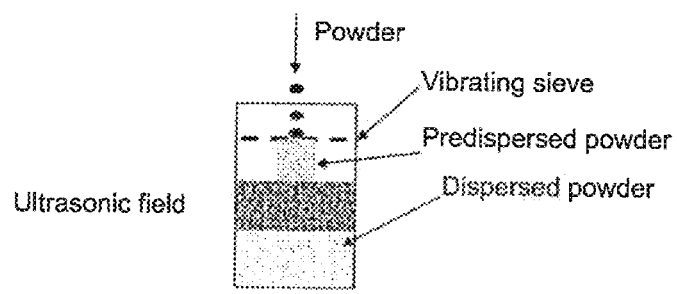

FIG. 1: image of a preferred apparatus for carrying out the method according to the invention FIG. 2: image of a wall-flow filter wall powder-sprayed according to the invention FIG. 3: increase in exhaust-gas back pressure by powder-spraying in a catalytically precoated filter FIG. 4: increase in filtration efficiency by the powder-spraying according to the invention in a catalytically precoated filter FIG. 5: section through a powder-sprayed wall of a wall-flow filter and graphical analysis of points of powder-spraying FIG. 6: increase in exhaust-gas back pressure by powder-spraying in a non-catalytically precoated filter FIG. 7: increase in filtration efficiency by the powder-spraying according to the invention in a non-catalytically precoated filter FIG. 8: dispersion by ultrasound; powder in free fall FIG. 9: dispersion by ultrasound; powder in free fall; with sieve FIG. 10: dispersion by ultrasound; powder in free fall; predispersed with sieve FIG. 11: dispersion by an ultrasonic sieve FIG. 12: dispersion energies of a pin mill or jet mill FIG. 13: dispersion by a blower

EXAMPLES WITH CATALYTICALLY PRECOATED FILTERS

Cordierite wall-flow filters with a diameter of 11.8 cm and a length of 13.5 cm were in-wall coated in order to produce the VGPF, GPF1, GPF2, and GPF3 particulate filters described in the examples and comparative examples. The wall-flow filters had a cell density of 46.5 cells per square centimeter at a wall thickness of 0.203 mm. The average pore size of the filters was 20 µm, with the porosity of the filters being about 65%.

First, a coating suspension containing noble metal was applied to these wall-flow filters. After application of the coating suspension, the filters were dried and then calcined at 500° C. The amount of coating after calcination corresponded to 50 g/l based on the volume of the substrate. This corresponds to the preparation of the VGPF.

According to FIG. 1, 3 filters were coated with different amounts of aluminum oxide powder in the pores by means of the apparatus.

Example 1

GPF1: The open pores of an in-wall-coated filter were coated according to the invention with 3.3 g/l, based on the total filter volume, of a dry aluminum oxide. An aluminum oxide having an average particle diameter (d50) of 3.5 µm was used as the powder. This corresponds to a ratio of the average particle size of the powder used to the average pore size of the filter of 0.175.

Example 2

GPF2: The open pores of an in-wall-coated filter were coated according to the invention with 5.6 g/l, based on the total filter volume, of a dry aluminum oxide. An aluminum oxide having an average particle diameter ($d_{50}$) of 3.5 µm was used as the powder. This corresponds to a ratio of the average particle size of the powder used to the average pore size of the filter of 0.175.

Example 3

GPF3: The open pores of an in-wall-coated filter were coated according to the invention with 8.6 g/l, based on the total filter volume, of a dry aluminum oxide. An aluminum oxide having an average particle diameter ($d_{50}$) of 3 µm was used as the powder. This corresponds to a ratio of the average particle size of the powder used to the average pore size of the filter of 0.15.

The particulate filters GPF1, GPF2, and GPF3 according to the invention were investigated in comparison with the VGPF produced. After powder coating, the particulate filters were measured for their back pressure; as described below, filtration measurement was then carried out on the dynamic engine test bench. The back-pressure increase of the filters according to the invention is shown in FIG. 3.

The VGPF, GPF1, GPF2, and GPF3 filters described were investigated for their fresh filtration efficiency on the engine test bench in the real exhaust gas of an engine operating with an on average stoichiometric air/fuel mixture. A globally standardized test procedure for determining exhaust emissions, or WLTP (Worldwide harmonized Light vehicles Test Procedure) for short, was used here. The driving cycle used was WLTC Class 3. The respective filter was installed close to the engine immediately downstream of a conventional three-way catalyst. This three-way catalyst was the same one for all filters measured. Each filter was subjected to a WLTP. In order to be able to detect particulate emissions during testing, the particle counters were installed upstream of the three-way catalyst and downstream of the particulate filter. FIG. 4 shows the results of the filtration efficiency measurement in the WLTP.

FIG. 4 shows the results of the filtration efficiency measurement. Depending on the amount of powder applied and the particle size distribution of the powder used, an improvement in the filtration efficiency by up to 20% at a maximum back-pressure increase (FIG. 3) of only about 9% can be achieved.

The measured data demonstrate that the selective coating of the open pores of an already in-wall-coated filter leads to a significant improvement in filtration efficiency with only slightly increased back pressure.

Catalytic Characterization:

The particulate filters VGPF2 as well as GPF4, GPF5 were used for catalytic characterization. The wall-flow filters had a cell density of 46.5 cells per square centimeter at a wall thickness of 0.203 mm. The average pore size of the filters was 18 µm, with the porosity of the filters being about 65%. First, a coating suspension containing noble metal was applied to these wall-flow filters. After application of the coating suspension, the filters were dried and then calcined at 500° C. The amount of coating after calcination corresponded to 75 g/l, the concentration of Pd being 1.06 g/l and concentration for Rh being 0.21 g/l. All concentrations are based on the volume of the substrate.

Example 4

GPF4: The open pores of an in-wall-coated filter were coated with 10 g/l, based on the total filter volume, of a dry aluminum oxide. An aluminum oxide having an average particle diameter ($d_{50}$) of 3.5 μm was used as the powder. This corresponds to a ratio of the average particle size of the powder used to the average pore size of the filter of 0.194.

Example 5

GPF5: The open pores of an in-wall-coated filter were coated with 15.8 g/l, based on the total filter volume, of a dry aluminum oxide. An aluminum oxide having an average particle diameter ($d_{50}$) of 3.5 μm was used as the powder. This corresponds to a ratio of the average particle size of the powder used to the average pore size of the filter of 0.194.

The catalytically active particulate filters VGPF2, GPF4, and GPF5 were first tested in the fresh state and were then aged together in an engine test bench aging process. The latter consists of an overrun cut-off aging process (Aging 1) with an exhaust gas temperature of 900° C. upstream of the catalyst inlet (maximum bed temperature of 970° C.). The aging time was 19 hours. After the first aging process, the filters were examined for their catalytic activity and then subjected to a further engine test bench aging process (Aging 2). This time, the latter consists of an overrun cut-off aging process with an exhaust gas temperature of 950° C. upstream of the catalyst inlet (maximum bed temperature of 1030° C.). The filters were then tested repeatedly.

In the analysis of catalytic activity, the light-off behavior of the particulate filters was determined at a constant average air ratio λ on an engine test bench, and the dynamic conversion was checked when λ changed. In addition, the filters were subjected to a "lambda sweep test."

The following tables contain the temperatures $T_{50}$ at which 50% of the component under consideration are respectively converted. In this case, the light-off behavior with stoichiometric exhaust gas composition (λ=0.999 with ±3.4% amplitude) was determined. The standard deviation in this test is ±2° C.

Table 1 contains the "light-off" data for the fresh filters, Table 2 the data after Aging 1, and Table 3 the data after Aging 2.

TABLE 1

| | $T_{50}$ HC stoichiometric | $T_{50}$ CO stoichiometric | $T_{50}$ NOx stoichiometric |
|---|---|---|---|
| VGPF2 | 279 | 277 | 278 |
| GPF4 | 279 | 275 | 277 |
| GPF5 | 278 | 274 | 277 |

TABLE 2

| | $T_{50}$ HC stoichiometric | $T_{50}$ CO stoichiometric | $T_{50}$ NOx stoichiometric |
|---|---|---|---|
| VGPF2 | 347 | 351 | 355 |
| GPF4 | 350 | 353 | 356 |
| GPF5 | 349 | 352 | 355 |

TABLE 3

| | $T_{50}$ HC stoichiometric | $T_{50}$ CO stoichiometric | $T_{50}$ NOx stoichiometric |
|---|---|---|---|
| VGPF2 | 396 | 421 | 422 |
| GPF4 | 398 | 413 | 419 |
| GPF5 | 394 | 406 | 412 |

The dynamic conversion behavior of the particulate filters was determined in a range for λ of 0.99 to 1.01 at a constant temperature of 510° C. The amplitude of λ in this case was ±3.4%. Table 3 shows the conversion at the intersection of the CO and NOx conversion curves, along with the associated HC conversion of the aged particulate filters. The standard deviation in this test is ±2%.

Table 4 contains the data for the fresh filters, Table 5 the data after Aging 1, and Table 6 the data after Aging 2.

TABLE 4

| | CO/NOx conversion at the intersection | HC conversion at the λ of the CO/NOx intersection |
|---|---|---|
| VGPF2 | 99% | 99% |
| GPF4 | 99% | 99% |
| GPF5 | 99% | 99% |

TABLE 5

| | CO/NOx conversion at the intersection | HC conversion at the λ of the CO/NOx intersection |
|---|---|---|
| VGPF2 | 98% | 97% |
| GPF4 | 98% | 97% |
| GPF5 | 98% | 97% |

TABLE 6

| | CO/NOx conversion at the intersection | HC conversion at the λ of the CO/NOx intersection |
|---|---|---|
| VGPF2 | 79% | 94% |
| GPF4 | 80% | 94% |
| GPF5 | 83% | 95% |

In comparison to VGPF2, particulate filters GPF4 and GPF5 according to the invention show no disadvantage in catalytic activity in either the fresh or the moderately aged states. In a highly aged state, the powder-coated filters GPF4 and GPF5 even have an advantage in both CO conversion and NOx conversion and also in the dynamic CO/NOx conversion.

Examples with Non-Catalytically Precoated Filters:

Cordierite wall-flow filters with a diameter of 15.8 cm and a length of 14.7 cm were used to produce the VGPF, GPF1, and GPF2 particulate filters described in the examples and comparative examples. The wall-flow filters had a cell density of 31 cells per square centimeter at a wall thickness of 0.203 mm. The average q3 pore size (d50) of the filters was 18 μm, with the porosity of the filters being about 50%.

For coating the filters according to the invention, an air/powder aerosol of a dry aluminum oxide with a d10 value of the q3 particle size of 0.8 μm, a d50 value of the q3 particle size of 2.9 μm, and a d90 value of the q3 particle size of 6.9 μm was used. This corresponds to a ratio of the average particle size of the powder used to the average pore size of the filter of 0.16 and a ratio of d10 to d50 of 28%.

As comparative example, VGPF, an untreated filter as described above was used. The coating was carried out with an apparatus as described in FIG. 1.

Example 1

GPF1: The open pores of a filter were coated with 6 g/l, based on the total filter volume, of the dry aluminum oxide.

Example 2

GPF2: The open pores of a filter were coated with 11.7 g/l, based on the total filter volume, of the dry aluminum oxide.

The particulate filters GPF1 and GPF2 according to the invention were investigated in comparison with the conventional VGPF. After coating, the particulate filters were measured for their back pressure, after which filtration measurement was then carried out on the highly dynamic engine test bench. The increase in back pressure of the filters according to the invention, measured on a back-pressure test stand (Superflow ProBench SF1020) at room temperature with an air throughput of 600 m$^3$/h, is shown in FIG. 6.

The VGPF, GPF1, and GPF2 filters described were investigated for their fresh filtration efficiency on the engine test bench in the real exhaust gas of an engine operating with an on average stoichiometric air/fuel mixture. A globally standardized test procedure for determining exhaust emissions, or WLTP (Worldwide harmonized Light vehicles Test Procedure) for short, was used here. The driving cycle used was WLTC Class 3. The respective filter was installed 30 cm downstream of a conventional three-way catalyst. This three-way catalyst was the same one for all filters measured. Each filter was subjected to a WLTP. In order to be able to detect particulate emissions during testing, the particle counters were installed upstream of the three-way catalyst and downstream of the particulate filter. FIG. 7 shows the results of the filtration efficiency measurement in the WLTP.

FIG. 7 shows the results of the filtration efficiency measurement. Depending on the amount of powder applied, an improvement in filtration efficiency up to 10% is already observed in the first WLTP cycle with a slight back-pressure increase (FIG. 6).

The measured data demonstrate that the selective coating of the open pores of a conventional ceramic wall-flow filter leads to a significant improvement in filtration efficiency with only slightly increased back pressure.

The invention claimed is:

1. A method for producing a wall-flow filter, having inlet and outlet channels, for reducing the harmful substances in the exhaust gas of an internal combustion engine, wherein a dry wall-flow filter is selectively impinged on its inlet surface with a dry powder/gas aerosol which has at least one high-melting compound, such that the powder precipitates in porous filter walls positioned between the inlet and outlet channels of the wall-flow filter, wherein
   the powder is dispersed in a dispersion gas, then guided into a gas stream, and drawn into an inlet side of the wall-flow filter without further supply of a gas, wherein 5% to 35% of the total pore volume of the porous filter walls, between the inlet and outlet channels, is filled with deposited powder and wherein the powder is supplied in a sufficient amount as to at least fill in the pores of the inlet surface of the filter walls up to an input surface level of the pores.

2. Method according to claim 1,
   characterized in that
   the dispersion of the powder is affected by at least one of the following measures:
   dispersion by means of compressed air
   dispersion by ultrasound
   dispersion by sieving
   dispersion by "in-situ milling"
   dispersion by blower
   dispersion by expansion
   dispersion in a fluidized bed.

3. Method according to claim 1,
   characterized in that
   the powder has a moisture content of less than 20% at the time of impingement on the wall-flow filter.

4. Method according to claim 1,
   characterized in that
   the amount of powder remaining in the filter is below 50 g/l.

5. Method according to claim 1,
   characterized in that
   the powder coating has an increasing concentration gradient over the length of the filter from the inlet side to the outlet side.

6. Method according to claim 1,
   characterized in that
   the aerosol is a mixture of air and the at least one high-melting compound, wherein the at least one high-melting compound is a high-melting metal oxide, metal sulfate, metal phosphate, metal carbonate, or metal hydroxide powder or mixtures thereof.

7. Method according to claim 1,
   characterized in that
   the filter was catalytically coated prior to impingement with the powder/gas aerosol.

8. Method according to claim 1,
   characterized in that
   the powder is catalytically active with regard to the reduction of the harmful substances in the exhaust gas of an internal combustion engine.

9. Method according to claim 1,
   characterized in that
   the powder/gas aerosol is sucked through the filter at a rate of 10 m/s to 50 m/s.

10. Method according to claim 1,
    characterized in that
    at least one partial gas stream is extracted downstream of a suction device and, before the powder addition, is added to the gas stream which is sucked through the filter.

11. Method according to claim 1,
    characterized in that
    a defined powder distribution over the filter cross section is set by an accelerated flow upstream of the filter.

12. Method according to claim 1,
    characterized in that
    the powder is vortexed before flowing into the filter in such a way that deposits of powder on the inlet plugs of the wall-flow filter are avoided.

13. Method according to claim 1,
    characterized in that
    said filter has an increase in filtration efficiency of at least 5% at a relative increase in the exhaust-gas back pressure of at most 40% compared to a filter not treated with powder.

14. Method according to claim 1, wherein 8% to 35% of the total pore volume of the porous filter walls is filled with deposited powder.

15. Method according to claim 1, wherein the powder is drawn into the inlet at a rate of 15 m/s to 40 m/s.

16. Method according to claim 15, wherein the d90 value of the q3 particle size distribution of the powder is less than or equal to 50% of the average volume-related q3 pore size (d50) of the wall flow filter.

17. Method according to claim 1, wherein the dispersed powder is fed into the gas stream above and upstream of the wall-flow filter, and a suction source is positioned downstream of a bottom end of the wall-flow filter.

18. A method for producing a wall-flow filter for reducing the harmful substances in the exhaust gas of an internal combustion engine, wherein the wall-flow filter, while in a dry state, is selectively impinged on its inlet surface with a dry powder/gas aerosol which has at least one high-melting compound, such that the powder precipitates in pores of filter walls of the wall-flow filter, wherein the powder is dispersed in a dispersion gas, then guided into a gas stream, and drawn into an inlet of the wall-flow filter without further supply of a gas, and wherein the powder is drawn into the inlet at a rate of 10 m/s to 40 m/s, and wherein the powder is supplied in a sufficient amount as to at least fill in the pores of the inlet surface of the filter walls up to an input surface level of the pores.

19. Method according to claim 18, wherein the powder is drawn into the inlet at a rate of 15 m/s to 40 m/s.

20. Method according to claim 18, wherein an average q3 particle size of the powder (d50) is 5% to 30% of the average q3 pore size (d50) of the wall-flow filter.

21. Method according to claim 1, wherein sufficient powder is supplied as to fill up to the input surface level of the pores as well as to form a powder layer on the inlet surface of the filter walls.

22. Method according to claim 1, wherein powder is supplied as to fill up to the input surface level of the pores while avoiding formation of a complete or continuous powder layer on the inlet surface of the filter walls.

23. Method according to claim 18, wherein sufficient powder is supplied as to fill up to the input surface level of the pores as well as to form a powder layer on the inlet surface of the filter walls.

24. Method according to claim 18, wherein powder is supplied to fill up to the input surface level of the pores while avoiding formation of a complete or continuous powder layer on the inlet surface of the filter walls.

* * * * *